US012168174B2

(12) United States Patent
Olabode et al.

(10) Patent No.: US 12,168,174 B2
(45) Date of Patent: Dec. 17, 2024

(54) DATA DISPLAY OVERLAYS FOR ESPORT STREAMS

(71) Applicant: Sony Interactive Entertainment Inc., Tokyo (JP)

(72) Inventors: Richard Olabode, San Mateo, CA (US); Mario M. Sarria, Jr., San Mateo, CA (US); Warren M. Benedetto, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 117 days.

(21) Appl. No.: 17/561,525

(22) Filed: Dec. 23, 2021

(65) Prior Publication Data
US 2022/0203234 A1    Jun. 30, 2022

Related U.S. Application Data

(60) Provisional application No. 63/133,049, filed on Dec. 31, 2020.

(51) Int. Cl.
*A63F 13/537* (2014.01)
*A63F 13/5252* (2014.01)
(Continued)

(52) U.S. Cl.
CPC ........ *A63F 13/537* (2014.09); *A63F 13/5252* (2014.09); *A63F 13/5258* (2014.09); *A63F 13/86* (2014.09)

(58) Field of Classification Search
CPC ..... A63F 13/537; A63F 13/5252; A63F 13/86
See application file for complete search history.

(56) References Cited

U.S. PATENT DOCUMENTS 10,010,791 B2 *  7/2018  Ceraldi ................ A63F 13/798
10,300,394 B1    5/2019  Evans et al.
(Continued)

OTHER PUBLICATIONS

PCT/US2021/064726, Notification of Transmittal of the International Search Report and the Written Opinion of the International Searching Authority, or the Declaration, PCT/ISA/220, and the International Search Report, PCT/ISA/210, Mar. 24, 2022.

*Primary Examiner* — Justin L Myhr
*Assistant Examiner* — Carl V Larsen
(74) *Attorney, Agent, or Firm* — Penilla IP, APC

(57) ABSTRACT

Methods and systems are provided for selecting a viewport into a video game for a spectator viewing a video game played by a player. The method includes identifying a plurality of virtual cameras for providing a plurality of viewports into scenes of the video game. The method includes accessing a spectator playbook, the spectator playbook is stored in association with a profile of the spectator. The spectator playbook identifies viewing history of the spectator for types of video games viewed by the spectator. The method includes accessing a player playbook, the player playbook is stored in association with a profile of the player. The player playbook identifies performance of the player for types of video games played by the player. The method includes accessing gameplay data for the video game played by the player. The method includes selecting a viewport from the plurality of viewports into the video game. The selected viewport is dynamically updated based on processing the spectator playbook, the player playbook, and changes in the gameplay data. The method includes streaming a spectator video stream for the spectator. The spectator video stream automatically changes based on the dynamic updating of the viewport while the spectator views the video game. In this way, viewports into a video game are selected (Continued)

and dynamically updated to provide the spectator with a customized viewing experience.

18 Claims, 8 Drawing Sheets

(51) Int. Cl.
*A63F 13/5258* (2014.01)
*A63F 13/86* (2014.01)

(56) References Cited

U.S. PATENT DOCUMENTS

| | | | | |
|---|---|---|---|---|
| 10,735,815 | B1* | 8/2020 | Zhan | H04N 21/2385 |
| 10,924,823 | B1* | 2/2021 | Binder | H04N 21/4722 |
| 10,974,140 | B1* | 4/2021 | Verfaillie | A63F 13/32 |
| 10,987,596 | B2 | 4/2021 | Evans et al. | |
| 11,071,919 | B2 | 7/2021 | Willette et al. | |
| 2003/0038805 | A1* | 2/2003 | Wong | A63F 13/86 |
| | | | | 345/473 |
| 2013/0083173 | A1* | 4/2013 | Geisner | G02B 27/017 |
| | | | | 348/51 |
| 2014/0038708 | A1* | 2/2014 | Davison | A63F 13/69 |
| | | | | 463/31 |
| 2014/0113718 | A1* | 4/2014 | Norman | A63F 13/822 |
| | | | | 463/31 |
| 2017/0001111 | A1 | 1/2017 | Willette et al. | |
| 2017/0011554 | A1* | 1/2017 | Burba | G06T 15/20 |
| 2017/0142480 | A1* | 5/2017 | Gupta | H04N 13/167 |
| 2017/0157512 | A1* | 6/2017 | Long | A63F 13/497 |
| 2017/0282075 | A1* | 10/2017 | Michot | A63F 13/86 |
| 2018/0077345 | A1* | 3/2018 | Yee | H04N 23/69 |
| 2018/0304153 | A1* | 10/2018 | Hohjoh | A63F 13/55 |
| 2019/0118086 | A1* | 4/2019 | Gentile | A63F 13/25 |
| 2019/0270018 | A1 | 9/2019 | Evans et al. | |
| 2020/0030697 | A1* | 1/2020 | Mueller | A63F 13/77 |
| 2020/0169793 | A1* | 5/2020 | Åkerfeldt | H04N 21/2187 |
| 2020/0289934 | A1 | 9/2020 | Azmandian et al. | |
| 2021/0056750 | A1* | 2/2021 | Rowley | G06T 7/292 |
| 2021/0205702 | A1* | 7/2021 | Sanders | A63F 13/525 |
| 2021/0286179 | A1* | 9/2021 | Miller, IV | G06F 3/013 |

* cited by examiner

Player Profile Table

| Player | Player Info | Player BIO | Signature Move | Player Stats 2020 ||||||||||
|---|---|---|---|---|---|---|---|---|---|---|---|---|
| | | | | Rank | GP | MPG | FGP | FTP | REB | AST | STL | BLK | TO | PTS |
| Player 1 | Name: Taylor Woods<br>Position: PG<br>Team: Dallas Bears<br>Yrs Exp: 5 | *Current college student at UCLA<br>*Has been playing competitively for the last two years | Crossover | 10 | 57 | 36.1 | 0.455 | 0.845 | 4.2 | 6.1 | 1.2 | 0.4 | 3.4 | 30.5 |
| Player 2 | Name: Sean Middleton<br>Position: SG<br>Team: San Jose Giants<br>Yrs Exp: 3 | *Current college student at San Jose CC<br>*Has been playing competitively for the last 2 years | Eurostep, 3-point shot | 14 | 65 | 35.9 | 0.489 | 0.934 | 3.3 | 5.3 | 0.89 | 0.32 | 4.1 | 26.6 |
| Player 3 | Name: Kate James<br>Position: SF<br>Team: Seattle Tundra<br>Yrs Exp: 7 | *15 yrs old<br>*Enjoys skateboarding<br>*Favorite Music Genre is Country | One-legged fadeaway | 4 | 67 | 30.1 | 0.511 | 0.87 | 6.6 | 8.8 | 2.6 | 5.4 | 4.3 | 34.5 |
| Player N | Name: Cody Kim<br>Position: PF<br>Team: New York Knights<br>Yrs Exp: 1 | *Cody is currently a business major in college<br>* After playing in high school, Cody pursued a career in video games competitively and qualified for the league amidst working towards his degree | Skyhook | 24 | 55 | 17.3 | 0.39 | 0.81 | 11.2 | 5.2 | 1.7 | 8.9 | 3.9 | 15.4 |

FIG. 5

DATA DISPLAY OVERLAYS FOR ESPORT STREAMS

CLAIM OF PRIORITY

This application claims priority under 35 U.S.C. 119(e) to U.S. Provisional Patent Application No. 63/133,049 filed Dec. 31, 2020, the disclosure of which is incorporated herein by reference in its entirety for all purposes.

BACKGROUND

1. Field of the Disclosure

The present disclosure relates generally to selecting a viewport into a video game, and more particularly to methods and systems for selecting a viewport into a video game to provide the spectator with a customized spectator video stream.

2. Description of the Related Art

The video game industry has seen many changes over the years. In particular, the electronic (e.g., E-sports) industry has seen a tremendous growth in terms of the number of live events, viewership, and revenue. To this end, developers have been seeking ways to develop sophisticated operations that would enhance the viewing experience of spectators who may become bored, frustrated, or uninterested in the game actions that are displayed to the spectator while viewing the E-sports events.

A growing trend in the E-sports industry is to develop unique ways that will enhance the viewing experience of spectators viewing an E-sports event. Unfortunately, many spectators who watch an E-sports event may become frustrated with the video stream that they are viewing because it does not include content that they are interested in viewing nor does it include a particular viewpoint, e.g., camera angle, into the video game scene that they prefer to view it from. For example, when a spectator accesses an E-sports event to watch players compete in a competition, the spectator may be interested in the gameplay of specific players competing in the competition. Unfortunately, some spectators may find it burdensome to manually select and update the viewports throughout the progression of the gameplay to capture the specific players that they are most interested in watching. Unfortunately, this may lead to the spectator being frustrated with their viewing experience and not wanting to continue watching the video game competition or game. As a result, many spectators might find that the process of watching live or recorded E-sports events too burdensome and the spectators may lose interest in viewing additional events in the future.

It is in this context that implementations of the disclosure arise.

SUMMARY

Implementations of the present disclosure include methods, systems, and devices relating to selecting a viewport into a video game for a spectator viewing a video game played by a player or players. In some embodiments, methods are disclosed that provide a customized spectator video stream for each spectator viewing the video game where viewports into the video game are selected and dynamically updated based on a profile of the spectator, a profile of a player playing the video game, gameplay data or combinations thereof. For example, spectators who are viewing the gameplay of players competing in an E-sports event may be interested in viewing the E-sports event from a specific viewpoint or may want to focus on the gameplay of certain players competing in the E-sports event. Instead of requiring the spectator to manually select a desired viewport (if available) into the E-sports event, the methods disclosed herein outline ways of dynamically selecting and updating a viewport into a video game so that the spectator is provided with a customized spectator video stream that include viewports that are predicted to be preferred by the spectator. In this way, the viewing experience of a spectator is enhanced and may result in the spectator watching additional video game events in the future.

Thus, while viewing the customized spectator video stream, the spectator may watch a video game event in a seamless manner without having to manually select the viewports. Further, the customized spectator video stream may capture all of the key game actions in the video game that are preferred by the spectator. In some embodiments, dynamic data may be generated regarding the players playing the video game and presented in the spectator video stream while the spectator views the video game. In one embodiment, the dynamic data can be customized for a particular spectator and can include data that is of interest to the spectator.

In one embodiment, a method for selecting a viewport into a video game for a spectator viewing a video game played by a player is provided. The method includes identifying a plurality of virtual cameras for providing a plurality of viewports into scenes of the video game. The method includes accessing a spectator playbook, the spectator playbook is stored in association with a profile of the spectator. The spectator playbook identifies viewing history of the spectator for types of video games viewed by the spectator. The method includes accessing a player playbook, the player playbook is stored in association with a profile of the player. The player playbook identifies performance of the player for types of video games played by the player. The method includes accessing gameplay data for the video game played by the player. The method includes selecting a viewport from the plurality of viewports into the video game. The selected viewport is dynamically updated based on processing the spectator playbook, the player playbook, and changes in the gameplay data. The method includes streaming a spectator video stream for the spectator. The spectator video stream automatically changes based on the dynamic updating of the viewport while the spectator views the video game. In this way, viewports into a video game are selected and dynamically updated to provide the spectator with a customized viewing experience.

In another embodiment, a method for selecting a viewport into a video game for a spectator viewing the video game played by a player is provided. The method includes identifying, by a server, a plurality of virtual cameras for providing a plurality of viewports into scenes of the video game. The method includes accessing, by a server, a spectator playbook. The spectator playbook is stored in association with a profile of the spectator. The spectator playbook identifies viewing history of the spectator for types of video games viewed by the spectator. The method includes accessing, by a server, a player playbook. The player playbook is stored in association with a profile of the player. The player playbook identifies performance of the player for types of video games played by the player. The method includes accessing, by a server, gameplay data for the video game played by the player. The method includes selecting, by a server, a viewport from the plurality of viewports into the video game. The selected viewport is dynamically updated based on processing the spectator playbook, the player playbook, and changes in the gameplay data through a machine learning model. The machine learning model is configured to identify features from the spectator playbook, the player playbook, and the gameplay data to classify attributes of the spectator, the attributes of the spectator being used to select the viewport. The method includes streaming, by a server, a spectator video stream for the spectator. The spectator video stream automatically changes based on the dynamic updating of the viewport while the spectator views the video game.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIG. 5 illustrates an embodiment of a player profile table illustrating player gaming metrics and various information associated with a plurality of players playing a video game, in accordance with an implementation of the disclosure.

DETAILED DESCRIPTION

Figure 1:
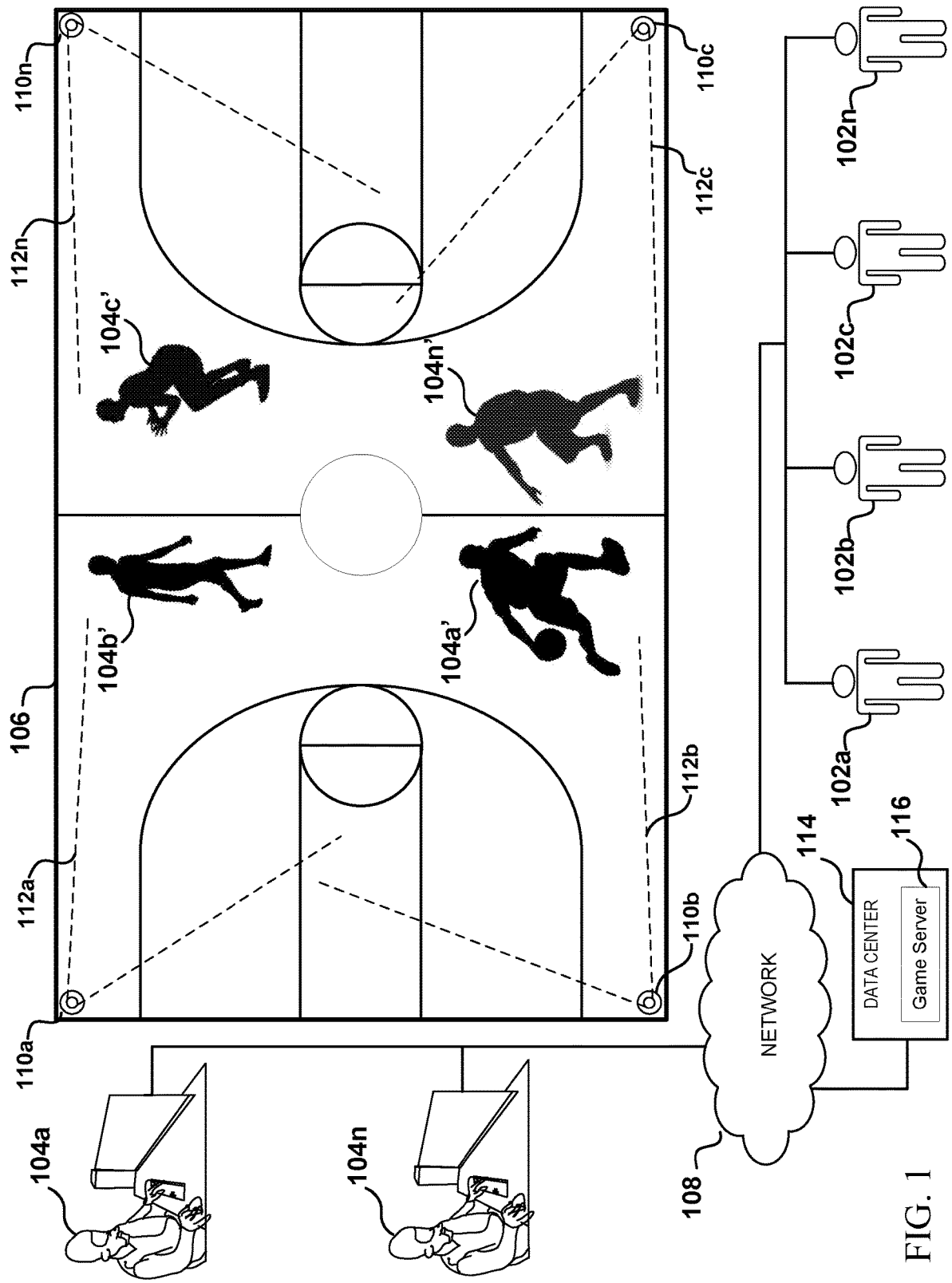
FIG. 1 illustrates an embodiment of a system that is configured to execute a gameplay for a plurality of players and to stream a customized spectator video stream to each one of the plurality of spectators viewing the gameplay of the plurality of players, in accordance with an implementation of the disclosure.

The following implementations of the present disclosure provide methods, systems, and devices for selecting a viewport into a video game for a spectator viewing the video game played by a player or group of players. In particular, while viewing the gameplay of a plurality of players playing a video game, each spectator viewing the video game may be provided with a customized spectator video stream that includes viewports into the scenes of the video game that are preferred by each of the spectators. As used herein, a viewport may include the virtual camera angle presented to the user for viewing into the game scene. In some cases, the virtual camera angle is dynamically generated for the user in substantial real-time. In other cases, the viewport is selected from among one or more executing virtual camera angles. Accordingly, the dynamic selection of viewports during the spectating facilitates an enhanced viewing experience for each spectator since the viewports are selected based on the predicted viewing preferences of the respective spectator.

By way of example, while watching an E-sports event that involves a basketball game, each spectator may have a preference for a particular viewpoint, viewing angle, event, game action, player, in-game character, etc. that are most interested in observing. Since the video game may include a plurality of virtual cameras that provide a plurality of viewports into the scenes of video game, a viewport is selected and dynamically updated based on processing of a spectator playbook, a player playbook, and changes occurring throughout the gameplay. Accordingly, throughout portions of the progression of the gameplay, a spectator may be provided with a spectator video stream that includes viewports into the scenes of the video game that are selected based on the preferences of the spectator.

In some embodiments, dynamic data (e.g., player information, player biography, player statistics, player specialized skills, etc.) regarding the player playing the video game may be generated and presented in the spectator video stream. Generally, the methods described herein provides a seamless and efficient way for a spectator to view a video game played by a plurality of player without having to manually select the viewports and having to look up specific information regarding a player or players playing the video game.

As used herein, the term "viewports" should be broadly understood to refer to different camera views into a specific video game. Generally, some video games are played by multiple players and in different locations of the game world. The game world has different actions occurring at the same time, such as actions by one or more players playing and taking actions in the game to score points, achieve goals, and/or interact with the game environment and/or other users. In this context, a game scene in the game world can include one or more camera views into the actions, and those camera views can provide spectators with different virtual camera view perspectives into the game scene or scenes. The camera views, therefore, provide viewports into one or more of the game scenes.

As used herein, the term

By way of example, in one embodiment, a method is disclosed that enables selecting a viewport into a video game for a spectator viewing the video game played by a player. The method includes identifying a plurality of virtual cameras for providing a plurality of viewports into scenes in the video game. In one embodiment, the method may further include accessing a spectator playbook. In one example, the spectator playbook is stored in association with a profile of the spectator and the spectator playbook identifies viewing history of the spectator for types of video games viewed by the spectator. In another embodiment, the method may include accessing a player playbook. In one example, the player playbook is stored in association with a profile of the player and the player playbook identifies performance of the player for types of video games played by the player. In some embodiments, the method includes accessing gameplay data for the video game played by the player. In another embodiment, the method includes selecting a viewport from the plurality of viewports into the video game. In one example, the selected viewport is dynamically updated based on processing the spectator playbook, the player playbook, and changes in the gameplay data. In another embodiment, the method includes streaming a spectator video stream for the spectator. In one example, the spectator video stream automatically changes based on the dynamic updating of the viewport while the spectator views the video game. It will be obvious, however, to one skilled in the art that the present disclosure may be practiced without some or all of the specific details presently described. In other instances, well known process operations have not been described in detail in order not to unnecessarily obscure the present disclosure.

In accordance with one embodiment, a system is disclosed for selecting a viewport into a video game for spectators viewing the video game such as an online multiplayer video game. For example, a plurality of spectators may be connected to view a plurality of players competing in a live gaming event such as an E-sports event. In one embodiment, the system includes a connection to a network. In some embodiments, a plurality of spectators can be connected over a network to view the players competing against one another in the live gaming event. In some embodiments, one or more data centers and game servers can execute the game and enable connections to a plurality of spectators and players when hosting the video game. The one or more game servers of the one or more data centers may be configured to receive, process, and execute data from a plurality of devices controlled by spectators and players.

In some embodiments, a customized spectator video stream can be created for each spectator viewing the video game. The customized spectator video stream includes a unique viewport that is selected for each spectator and is based on processing a spectator playbook associated with each spectator, a player playbook, and changes in occurring in the basketball game. The selected viewport may differ for each spectator viewing the basketball game. For example, a spectator watching a video game that involves a basketball game may be a fan of a particular player competing in the basketball game and only be interested the game actions of the particular player. Accordingly, the system may select viewports that captures the game actions of the particular player regardless of what the particular player is doing in the basketball game, e.g., shooting, passing, blocking, playing defense, sitting on the bench, etc.

In some embodiments, the system is configured to generate dynamic data regarding a player for presenting in the spectator video stream while the spectator views the video game. In one example, during the gameplay of a player, the system can generate dynamic data that includes various information associated with the player such as player biographical information, player statistics, player specialized skills, etc. In some embodiments, dynamic data is generated based on the profile of the spectator viewing the video game and the gameplay data. In this way, each spectator is provided with customized dynamic data that is preferred by the spectator.

With the above overview in mind, the following provides several example figures to facilitate understanding of the example embodiments.

FIG. 1 illustrates an embodiment of a system that is configured to execute a gameplay for a plurality of players 104 and to stream a customized spectator video stream to each of the plurality of spectators 102 viewing the gameplay of the plurality of players 104. In one embodiment, FIG. 1 illustrates spectators 102a-102n, players 104a-104n, a data center 114, a game server 116, and a network 108. The system of FIG. 1 may be referred to as a cloud gaming system, where multiple data centers 114 game servers 116 can work together to provide wide access to spectators 102 and players 104 in a distributed and seamless fashion.

In some embodiments, the players 104 can be playing a multiplayer online game where they are teammates or on opposing teams competing against one another. Players 104 can be configured to send game commands to the data center 114 and the game server 116 and through the network 108. In one embodiment, the players 104 can be configured to receive encoded video streams and decode the video streams received by the data center 114 and the game server 116. In some embodiments, the video streams may be presented to the players 104 on a display and/or a separate device such as a monitor or television. In some embodiments, the devices of the players 104 can be any connected device having a screen and internet connection.

In some embodiments, the spectators 102 can be coupled to and can communicate with the data center 114 and the game server 116 through the network 108. The spectators 102 are configured to receive encoded video streams and decode the video streams received from the data center 114 and the game server 116. The encoded video streams, for example, are provided by the cloud gaming system, while player and spectator devices provide inputs for interacting with the game. In one embodiment, each of the spectators 102 can receive a customized spectator video stream such as a video stream from a multiplayer online game that is being executed by players 104. In some embodiments, the customized spectator video stream of each of the spectators 102 may include viewports into scenes of the video game that are selected and dynamically updated based on a corresponding playbook of the spectator 102, a playbook of the player, and changes in the gameplay data.

As used herein, a playbook is a model that defines preferences of a player or spectator. The preferences can be generated directly as input from the player or spectator, or can be automatically generated based on how a player or spectator reacts, plays, takes action, selects options, completes tasks, historical actions, historical selections, historical communications, social interactions, actions not taken, preferences not selected, responses to challenges, trophies obtained, points scored, levels achieved, comments made, etc. The factors that define a playbook can be multi-dimensional, and can change over time based on the player or spectator's actions or non-actions. The playbook in some embodiments is itself defined by a model that is learned using artificial intelligence.

In some embodiments, the video streams may be presented to the spectators 102 on a display of the spectator or on a separate device such as a monitor, or television or head mounted display, or portable device. In some embodiments, the spectators 102 may be configured to send feedback to the data center 114 and the game server 116 through the network 108.

In other embodiments, while watching the video stream of the gameplay, a camera may be located in the physical environment of the spectator 102 and be configured to capture the reaction sand movements the spectator. In some embodiments, the camera may include gaze tracking to enable tracking of the gaze of the spectator. The camera can capture images of the eyes of the spectator, which are analyzed to determine the gaze direction of the spectator and any dilation associated with the pupils of the eyes of the spectator. In some embodiments, the gaze direction and the dilation of the pupils of a spectator can be used to determine whether the spectator is interested in a particular game scene that they are viewing. In some embodiments, the camera may be configured to track and capture a facial expression of the spectator during the gameplay which is analyzed to determine an emotion associated with the facial expression of the spectator.

In one example, according to the embodiment shown in FIG. 1, the spectators 102 are shown connected and viewing the gameplay of players 104 on a display 106. As shown on the display 106, the gameplay of the players 104 illustrates a game scene of the players 104 competing in a basketball game. As shown in the game scene, player characters 104a'-104n' representing players 104a-104n are shown on the basketball court competing against each other in the basketball game. During the progression of the gameplay, the players 104a-104n can control the various actions and movements of their corresponding player characters 104a'-104n', and the spectators 102 can view the various game actions occurring throughout the video game.

As further illustrated in the game environment shown on the display 106, in some embodiments, the video game may include a plurality of virtual cameras 110a-110n that are dispersed throughout the game environment and configured to record the gameplay. Each of the virtual cameras 110a-110n may have an associated camera point of view (POV) 112 that is configured to record and capture the game activity occurring within its periphery. Accordingly, the plurality of virtual cameras 110a-110n can capture and provide one or more unique viewports into the game scenes of the video game. In one embodiment, the virtual cameras 110a-110n may be fixed or can dynamically move with a corresponding game scene within the video game. As a result, since the plurality of virtual cameras 110a-110n can move in the game environment, the viewports associated with the virtual cameras may include various viewing angles into the scene of the video game. For example, as shown on the display 106 in FIG. 1, virtual cameras 110a-110n may be adjusted so that its corresponding camera POV 112a-112n can capture various viewpoint angles of the basketball court such as a bird's-eye view, a side-view, an upper-tier view, a lower-tier view, an end-view, or a zoomed-in view. In this way, various game actions in the basketball game can be captured and provided to the spectator, e.g., slam dunk, free throw, foul, fight between players characters, facial expression of player characters, crowd reaction, etc.

Figure 2:
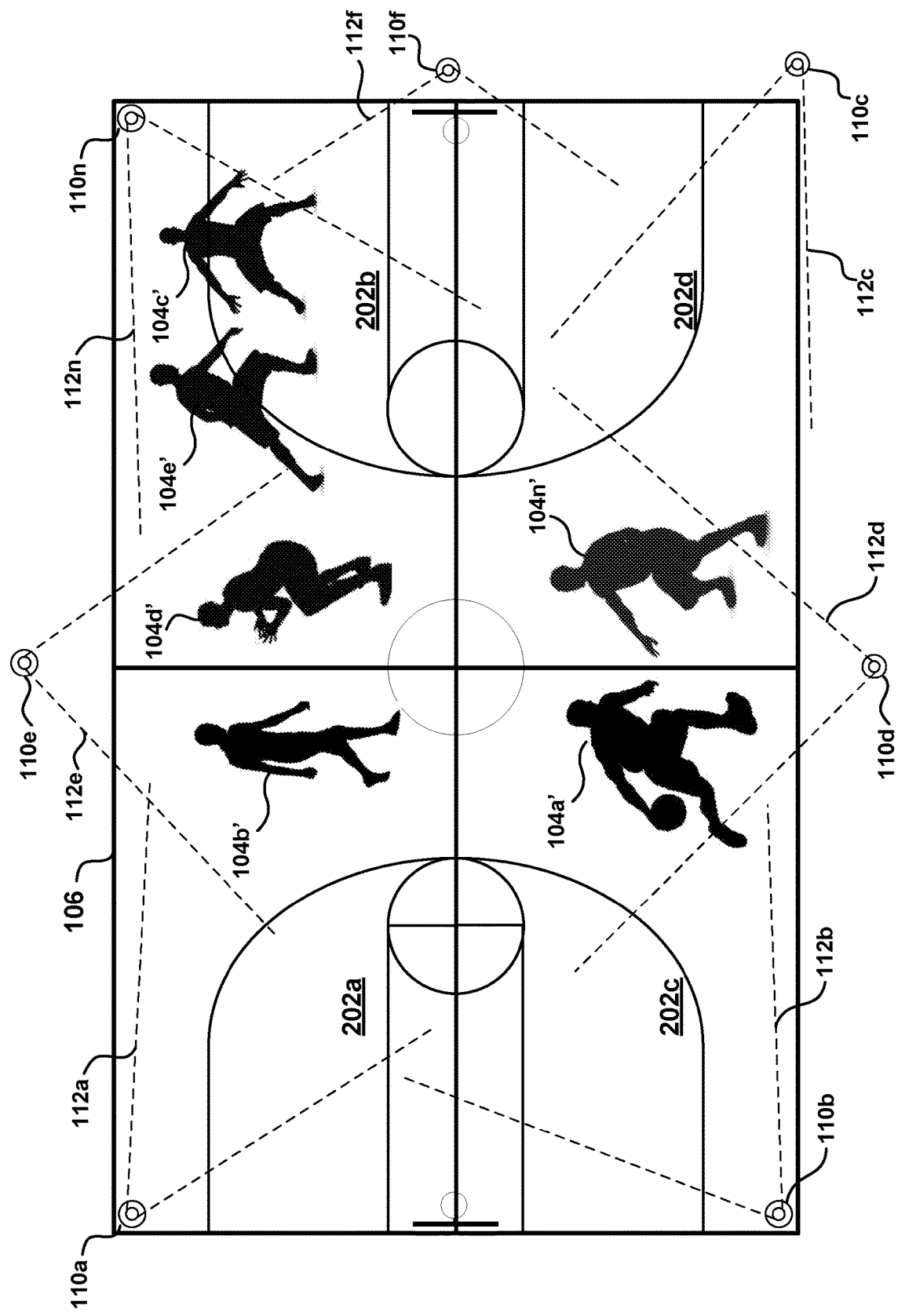
FIG. 2 illustrates an embodiment of multiple game regions within a game environment of a video game, in accordance with an implementation of the disclosure.

FIG. 2 illustrates an embodiment of multiple game regions 202a-202d within a game environment of a video game. As shown in FIG. 2, the game scene in the video game can include a plurality of game actions occurring simultaneously at a given time. For example, the game scene in FIG. 2 shows a gameplay of a 3-on-3 basketball game. As shown, player character 104a', 104b', and 104c' are on the same team and are competing against opposing player characters 104d', 104e' and 104n'. Player character 104a' is shown dribbling a basketball and moving toward one end of the basketball court while being guarded by opposing player character 104n'. Player character 104b' is shown walking toward one end of the basketball court while being guarded by opposing player character 104d'. Player character 104c' is shown attempting to get into a desired position to receive a pass from player 104a' while opposing player character 104e' guards player character 104c'.

As noted above, virtual cameras 110a-110n can be positioned anywhere within the game environment and be configured to capture different perspectives of the game actions occurring in the game environment of the video game. Throughout the progression of the gameplay, the virtual cameras 110a-110n may be dynamically adjusted to provide the spectator with viewing angles that are preferred by the spectator. For example, in one embodiment, the position of a virtual camera 110 can be adjusted so that the camera POV 112 includes a bird's-eye view of a player character 104' dunking a basketball. Accordingly, each of the virtual cameras 110 can be configured to dynamically move and its corresponding POV 112 can capture a unique perspective of the game scene and provide a unique viewport into the video game.

Figure 3A:
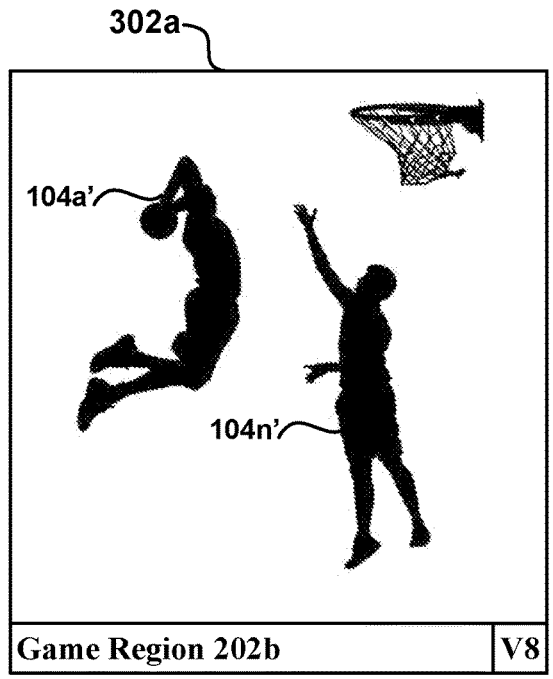
FIGS. 3A-3D illustrate various embodiments of a spectator interface with a corresponding viewport that is selected by the system based on processing a spectator playbook, a player playbook, and gameplay data, in accordance with an implementation of the disclosure.

FIGS. 3A-3D illustrate various embodiments of a spectator interface 302 with a corresponding viewport that is selected by the system based on processing a spectator playbook, a player playbook, and gameplay data. As noted above, a viewport corresponds to a virtual camera 110 and its corresponding camera POV 112 in the game environment of the video game which provides a view into the game scenes in the video game. In one embodiment, as shown in FIG. 3A, the figure illustrates a spectator interface 302a with a corresponding viewport (e.g., V8) that is selected for a particular spectator 102 viewing the video game. As shown, the viewport (e.g., V8) corresponds to game region 202b in the game environment which includes a game scene of player character 104a' attempting to perform a slam dunk while an opposing player character 104n' attempts to deflect the slam dunk attempt.

In one embodiment, the selection of the viewport for inclusion into the spectator interface 302 is based on processing a playbook of a spectator 102, a playbook of a player 104, and gameplay data for the video game played by the player 104. In one embodiment, each spectator 102 may have a corresponding playbook. The playbook of a spectator 102 may include various attributes and information associated with the spectator 102 such as viewing preferences, favorite players, gender, age, gaming experience, game play history, viewing history, gaming skill level, interests, disinterests, etc. In some embodiments, the playbook of the spectator 102 may include the above-noted features, and additionally other features that have been processed using artificial intelligence to define a model for the playbook. In some embodiments, each player 104 may have a corresponding playbook. The playbook associated with a player 104 may include various attributes and information associated with the player 104 such as gameplay tendencies, specialized gaming skills, gaming skill level, player experience, signature game moves, biography information, statistics associated gameplay of the player, preferences, interests, disinterests, etc. Similar to the playbook of the spectator 102, the playbook of the player 104 may include the above-noted features, and additionally other features that have been processed using artificial intelligence to define a model for the playbook. Furthermore, the gameplay data may be produced by the plurality of players 104 during their gameplay and include gameplay metadata such as state data that identifies all of the actions, inputs, and moves made by each of the plurality of players 104 during the gameplay. In other embodiments, the gameplay data may include a variety of information associated with the video game that is played by the players 104 such as the scenes in the video game, progression in the video game, points scored, position and total number of virtual cameras, available viewports, contextual data regarding scenes in the video game, etc.

In some embodiments, the selection of the viewport for inclusion into the spectator interface 302 is based on processing the playbook of a spectator 102, the playbook of a player 104, and the gameplay data through a viewport recommendation model. The viewport recommendation model is configured to identify features from the playbook of a spectator 102, the playbook of a player 104, and the gameplay data to classify the features using one or more classifiers. The classified features are then used by the viewport recommendation model to predict and select a viewport that may align with the interest of the spectator 102 or be preferred by the spectator 102. For example, a playbook of a spectator 102 may reveal that the spectator 102 is a 25-year-old female who enjoys watching defensive plays in a basketball video game. Further, the playbook of a player 104 may indicate which of the players 104 playing the video game has strong attributes for having strong defensive skills (e.g., guarding a player, stealing a ball, blocking shots, etc.). Accordingly, based on the gameplay data and the playbook of a player 104, the system can predict the type of game actions the player characters 104' will perform and select viewports for the spectator 102 that includes game actions that relate to defensive plays. Accordingly, by using the viewport recommendation model that implements machine learning, the selection of the viewports is based on a prediction of what game actions that a spectator may prefer which can be configured to improve over time.

Figure 3B:
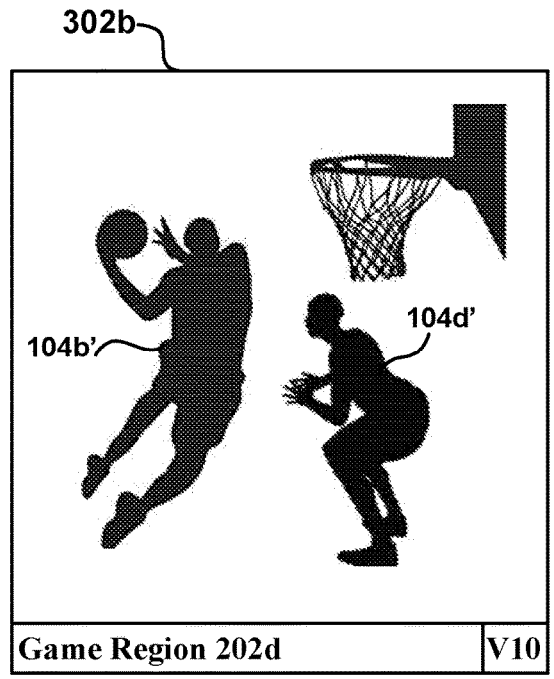

In another embodiment, FIG. 3B illustrates a spectator interface 302b with a corresponding viewport (e.g., V10) that is selected for a particular spectator 102 viewing the video game. As shown, the viewport (e.g., V10) corresponds to game region 202d in the game environment which includes a game scene of player character 104b' jumping in the air in an attempt to make a lay-up shot while opposing player character 104d' guards the player character 104b'. As noted above, the selection of the viewport for inclusion into the spectator interface 302b is based on processing the playbook of a spectator 102, the playbook of a player 104, and the gameplay data through a viewport recommendation model. The selected viewport can be dynamically updated throughout the progression of the gameplay where the selected viewport is predicted to include game actions of the players 104 that are likely to occur and would be preferred by the spectator 102.

Figure 3C:
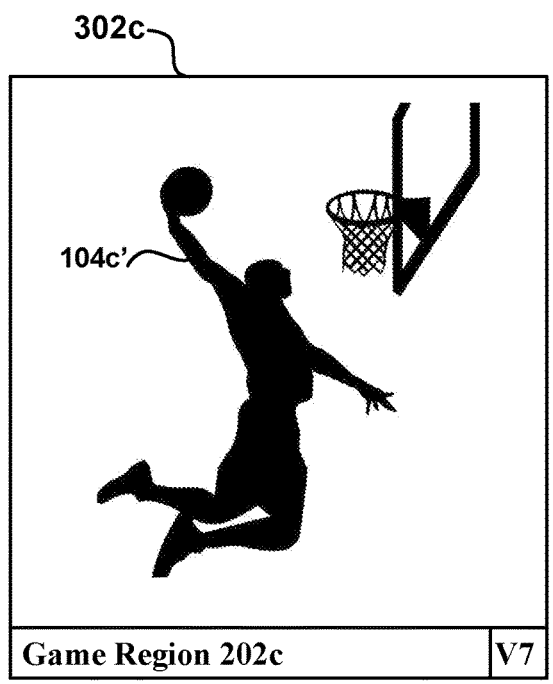

In another embodiment, FIG. 3C illustrates a spectator interface 302c with a corresponding viewport (e.g., V7) that is selected for a particular spectator 102 viewing the video game. As shown, the viewport (e.g., V7) corresponds to game region 202c in the game environment which includes a game scene of player character 104c' jumping in the air to dunk a basketball. As noted above, the selection of the viewport for inclusion into the spectator interface 302c is based on processing the playbook of a spectator 102, the playbook of a player 104, and the gameplay data through a viewport recommendation model. In this example, the viewport (e.g., V7) was selected for inclusion into the spectator interface 302c because the spectator 102 has a preference for game actions that involve slam-dunk attempts by player 104c.

Figure 3D:
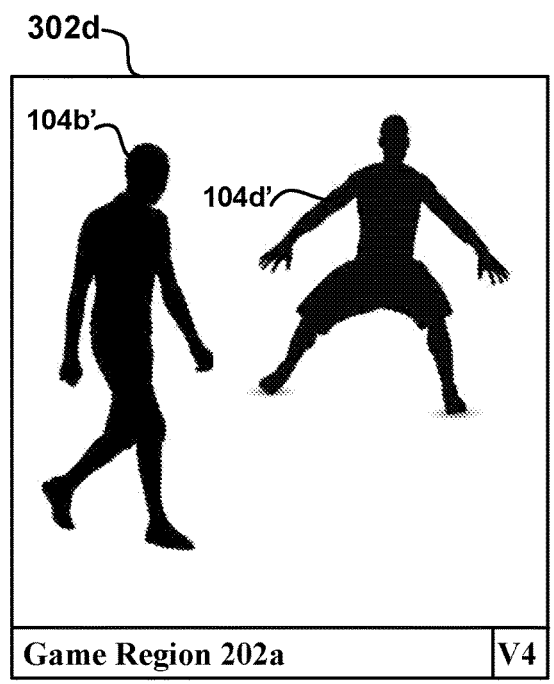

In another embodiment, FIG. 3D illustrates a spectator interface 302d with a corresponding viewport (e.g., V4) that is selected for a particular spectator 102 viewing the video game. As shown, the viewport (e.g., V4) corresponds to game region 202a in the game environment which includes a game scene of player character 104b' and opposing player character 104d' matched up against one another in the basketball game. In this example, viewport (e.g., V4) was selected for inclusion into the spectator interface 302d because the spectator 102 has a preference for game actions that involves defensive actions of player character 104d'. Accordingly, throughout the progression of the gameplay, the system can dynamically update the viewport to include game actions where opposing player character 104d' is predicted to make a defensive action against a player character in the video game.

FIGS. 4A-4D illustrate various embodiments of the spectator interface 302a-302d shown in FIGS. 3A-3D illustrating dynamic data 402 regarding the players 104 playing the video game. In one embodiment, the dynamic data 402 is customized for each spectator 102 and presented in a spectator video stream for display on the spectator 302 interface. In some embodiments, dynamic data 402 includes information regarding a player 104 playing the video game and the information regarding the player 104 is customized based on the profile of the spectator 102 and preferences of the spectator 102. For example, each spectator 102 viewing the video game may have various preferences and interests in the gameplay of the one or more players 104 competing in the video game. A spectator 102 may have an interest learning about the personal life of a player 104 playing the video game. Other spectators may have an interest in learning more about the accolades and achievements of the player 104 playing the video game.

In other embodiments, dynamic data 402 may include information regarding the one or more spectators 102 viewing the video game. For example, a spectator 102 viewing the video game may be a celebrity spectator with a large fan base. One or more of the spectators viewing the video game may be interested in the in the game scenes that the celebrity spectator is viewing and also the dynamic data that is generated for the celebrity spectator. Accordingly, in some embodiments, the system may generate dynamic data 402 or a viewport for a spectator based on the dynamic data and viewport that is generated for other spectators viewing the video game.

In one example, a profile of a spectator may indicate that the spectator viewing the gameplay has a strong interest in player data and analytics. Accordingly, when the dynamic data 402 is generated for the spectator, the dynamic data 402 may include information regarding the player such as game statistics, seasons statistics, predicted statistics, etc. In another example, a profile of a spectator viewing the video game may indicate that the spectator has an interest in the personal life of a particular player playing the video game. Accordingly, when the dynamic data 402 is generated for the spectator, the dynamic data 402 may include personal information regarding the player such as where the player grew up, number of years of experience, what the player does for fun, relationship status, etc.

Figure 4A:
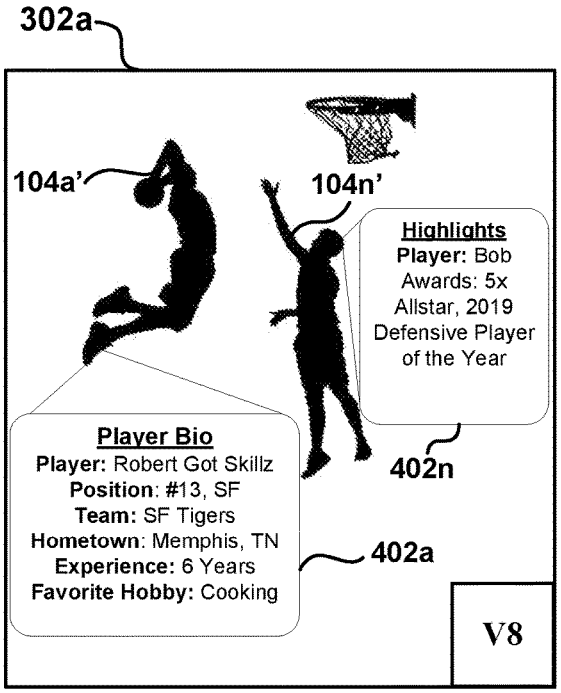
FIGS. 4A-4D illustrate various embodiments of the spectator interface shown in Figures illustrating dynamic data regarding the players playing the video game, in accordance with an implementation of the disclosure.

To illustrate an example of the dynamic data 402, referring to FIG. 4A, the figure illustrates the spectator interface 302a with a corresponding viewport (e.g., V8) that shows player character 104a' attempting to perform a slam dunk over player character 104n'. As shown, dynamic data 402a is generated and presented in the spectator video stream for a particular spectator 102 viewing the spectator interface 302a. The dynamic data 402a includes various information regarding the player that is controlling the player character 104a' such as the name of the player, position, team, hometown, experience, and favorite hobby. As noted above, the information included in the dynamic data 402a is generated based on the profile of the spectator viewing the spectator interface 302a and is predicted to be aligned with the interests and preferences of the spectator. As further illustrated in FIG. 4A, dynamic data 402n is generated and includes information regarding the player controlling the player character 104*n*'. As shown, dynamic data 402*n* includes information regarding various awards achieved by the player.

Figure 4B:
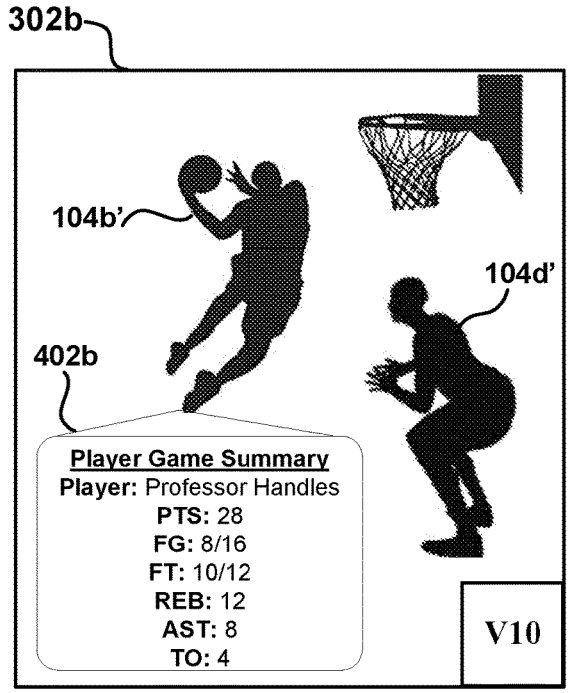

In another embodiment, as shown in FIG. 4B, the figure illustrates the spectator interface 302*b* with a corresponding viewport (e.g., V10) that shows player character 104*b*' jumping in the air in an attempt to make a lay-up shot. As shown, dynamic data 402*b* is generated and presented in the spectator video stream for a particular spectator 102 viewing the spectator interface 302*b*. The dynamic data 402*b* includes various information regarding the player that is controlling the player character 104*b*' such as the game summary of the player, e.g., points, rebounds, assists, turnovers, etc. In some embodiments, background information about the player may be provided, including examples of past wins, history against types of players, likelihood of performing types of plays, etc. The information included in the dynamic data 402*b* is generated based on the profile of the spectator viewing the spectator interface 302*b* and is predicted to be aligned with the interests and preferences of the spectator.

Figure 4C:
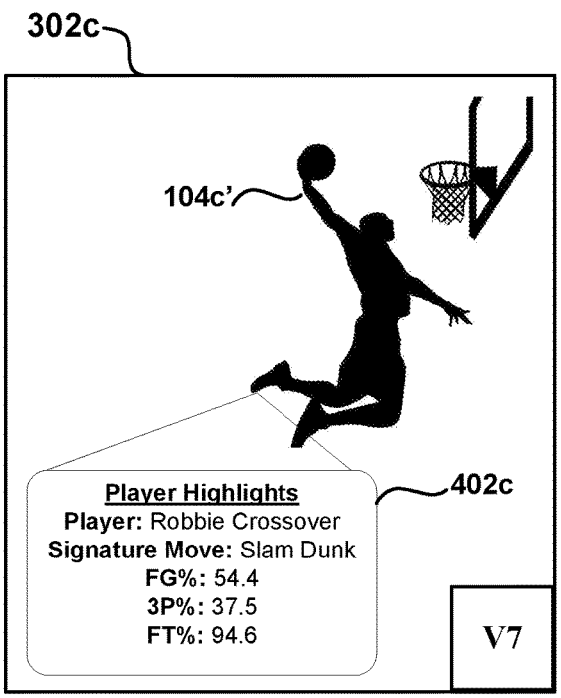

In another embodiment, as shown in FIG. 4C, the figure illustrates the spectator interface 302*c* with a corresponding viewport (e.g., V7) that shows player character 104*c*' attempting to dunk a basketball. As shown, dynamic data 402*c* is generated and presented in the spectator video stream for a particular spectator 102 viewing the spectator interface 302*c*. The dynamic data 402*c* includes various information regarding the player that is controlling the player character 104*c*' such as the career highlights of the player, e.g., signature move, field goal percentage, three point percentage, free throw percentage, etc. As noted above, the information included in the dynamic data 402*c* is generated based on the profile of the spectator viewing the spectator interface 302*c* and is predicted to be aligned with the interests and preferences of the spectator.

Figure 4D:
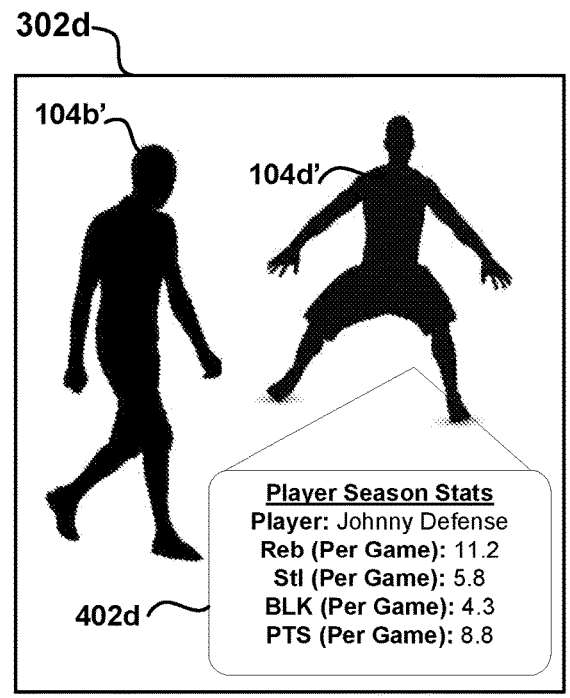

In another embodiment, as shown in FIG. 4D, the figure illustrates the spectator interface 302*d* with a corresponding viewport (e.g., V4) showing player character 104*d*' guarding player character 104*b*'. As shown, dynamic data 402*d* is generated and presented in the spectator video stream for a particular spectator 102 viewing the spectator interface 302*d*. The dynamic data 402*d* includes various information regarding the player that is controlling the player character 104*d*' such as the seasons statistics of the player, e.g., rebounds per game, steals per game, blocks per game, etc. As noted above, the information included in the dynamic data 402*d* is generated based on the profile of the spectator viewing the spectator interface 302*d* and is predicted to be aligned with the interests and preferences of the spectator.

FIG. 5 illustrates an embodiment of a player profile table 502 illustrating player gaming metrics and various information associated with a plurality of players playing a video game. As shown, the player profile table 502 includes a player identification 504 and various information associated with each player. In one embodiment, the player profile table 502 may include information such as player information 506, player biography 508, player signature moves 510, and various player season statistics 512. In one embodiment, the player season statistics 512 may include various statistical categories such as ranking, games played (GP), minutes per game (MPG), field goal percentage (FGP), free throw percentage (FTP), rebounds per game (REB), assists per game (AST), steals per game (STL), blocks per game (BLK), turnovers per game (TO), and points per game (PTG).

To provide an illustration of the player profile table 502 in FIG. 5, in one example, the system may determine that in a basketball game, player 2 plays shooting-guard and attempts a three-point shot from the corner region of the basketball court 74% of the time. Using the profile information of player 2 and the gameplay data of the video game, the system can determine player 2 will likely attempt a three-point shot when the player has possession of the ball along the corner region of the basketball court. Accordingly, viewports that are predicted to capture the three-point shot attempt by player 2 can be selected for spectators 102 who may have a preference for game actions that involve three-point shot attempts.

In some embodiments, the player profile table 502 can be used to generate the dynamic data 402 regarding the player 104 for presenting in the spectator video stream of a spectator 102. For example, a spectator 102 may have an interest in the personal life of a player rather than the statistics associated with the gameplay of a player. Accordingly, the system would generate dynamic data 402 for the spectator 102 that includes information from the player information 506 and the player biography 508 section of the table rather than the player season statistics 512 section of the table.

Figure 6:
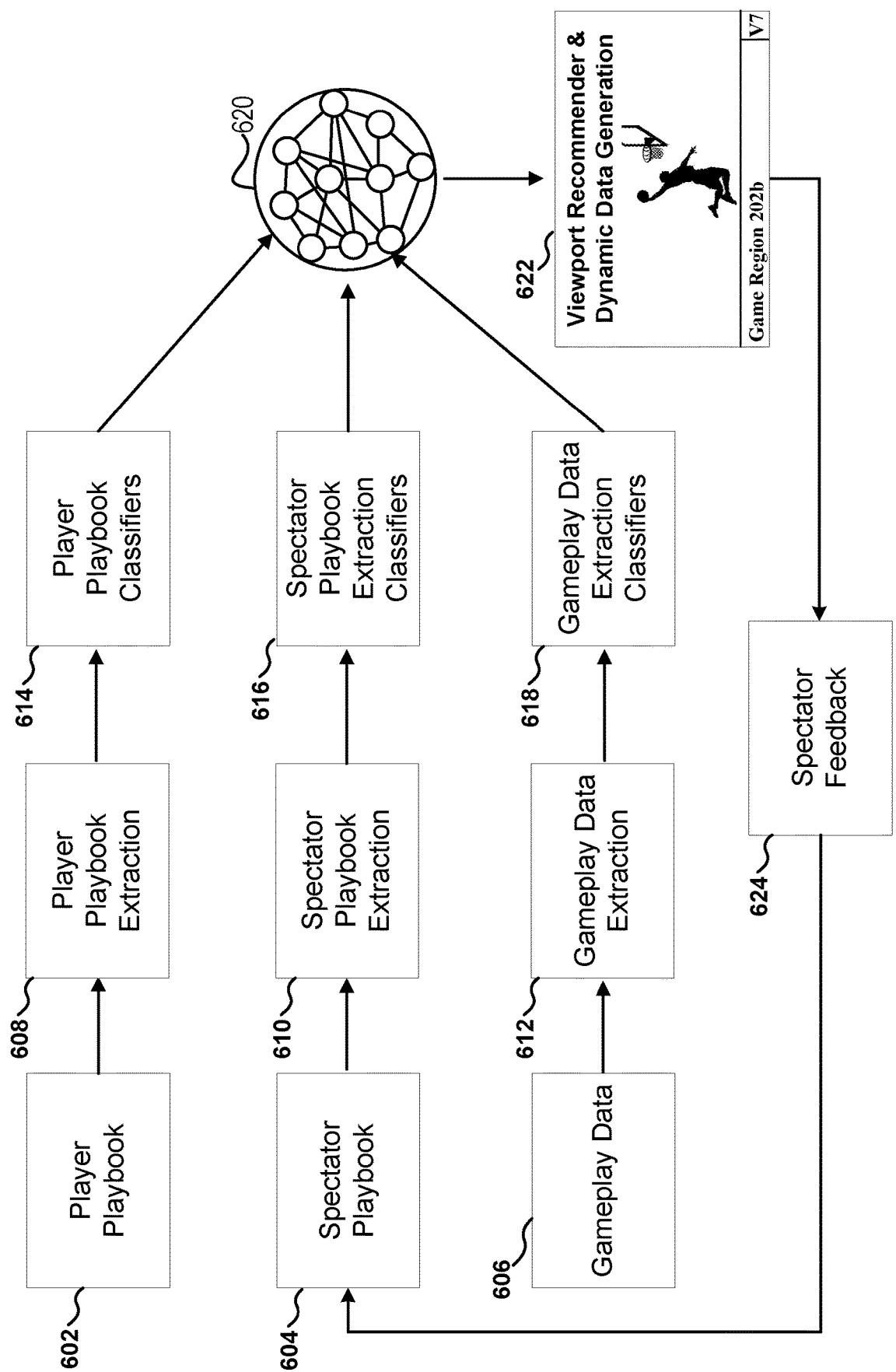
FIG. 6 illustrates an embodiment of a method for using a viewport recommendation model to dynamically select and update viewports for a spectator using a player playbook, a spectator playbook, and gameplay data as inputs, in accordance with an implementation of the disclosure.

FIG. 6 illustrates an embodiment of a method for using a viewport recommendation model 620 to dynamically select and update viewports for a spectator 102 using a player playbook 602, a spectator playbook 604, and gameplay data 606 as inputs. As noted above, the selected viewports may be unique for each spectator 102 viewing the video game and included in a spectator video stream of the spectator 102 to provide the spectator 102 with a customized viewing experience of the video game.

As shown in FIG. 6, in one embodiment, the system may include feature extraction operations (e.g., 608, 610, 612) that are configured to identify various features in the player playbook 602, the spectator playbook 604, and the gameplay data 606. After the feature extraction operations identifies the features associated with the inputs, classifier operations (e.g., 614, 616, 618) may be configured to classify the features using one or more classifiers. In some embodiments, the system includes a viewport recommendation model 620 that is configured to receive the classified features from the classifier operations. Using the classified features, the viewport recommendation model 620 can be used to recommend and select a viewport for the spectator 102. In some embodiments, operation 622 can use the viewport recommendation model 620 to determine which viewports to select for a particular spectator 102. In other embodiments, operation 622 can use the viewport recommendation model 620 to determine the type of information used for generating the dynamic data for the spectator 102. After the viewport and the dynamic data are selected and generated for the spectator 102, a spectator feedback 624 operation can be configured to capture the feedback of the spectator which can be incorporated into the spectator playbook 604.

In one embodiment, the system can process the player playbook 602. As noted above, the player playbook 602 may include various attributes and information associated with the player 104 such as gameplay tendencies, specialized gaming skills, gaming skill level, player experience, signature game moves, biography information, statistics associated gameplay of the player, preferences, interests, disinterests, etc. In some embodiments, the player playbook extraction 608 operation is configured to process the player playbook 602 to identify and extract features associated with the profile of the player. After the player playbook extraction 608 operation processes and identifies the features from the player playbook 602, the player playbook classifiers 614 operation is configured to classify the features using one or more classifiers. In one embodiment, the features are labeled using a classification algorithm for further refining by the viewport recommendation model 620.

In another embodiment, the system can process the spectator playbook 604. As noted above, the spectator playbook 604 may include various attributes and information associated with the spectator 102 such as viewport preferences, viewing angle preferences, favorite players, gender, age, gaming experience, game play history, viewing history, gaming skill level, interests, disinterests, etc. In some embodiments, the spectator playbook extraction 610 operation is configured to process the spectator playbook 604 to identify and extract features associated with the profile of the spectator. After the playbook extraction 610 operation processes and identifies the features from the spectator playbook 604, the playbook extraction 610 operation is configured to classify the features using one or more classifiers. In one embodiment, the features are labeled using a classification algorithm for further refining by the viewport recommendation model 620.

In another embodiment, the system can process the gameplay data 606. As noted above, the gameplay data 606 may include a variety of information associated with the video game that is being played by the players 104 such as the scenes in the video game, progression in the video game, points scored, position of the virtual cameras, total number of virtual cameras, available viewports, contextual data regarding the scenes in the video game, metadata, etc. In some embodiments, the gameplay data extraction 612 operation is configured to process the gameplay data 606 to identify and extract features associated with the gameplay of the players. After the gameplay data extraction 612 processes and identifies the features from the gameplay data 606, the gameplay data extraction classifiers 618 operation is configured to classify the features using one or more classifiers. In some embodiments, the features are labeled using a classification algorithm for further refining by the viewport recommendation model 620.

In some embodiments, the viewport recommendation model 620 is configured to receive as inputs the classified features (e.g., player playbook classified features, spectator playbook classified features, gameplay data classified features). In another embodiment, other inputs that are not direct inputs or lack of input/feedback, may also be taken as inputs to the viewport recommendation model 620. The viewport recommendation model 620 may use a machine learning model to predict viewports into scenes of the video game and dynamic data for a spectator 102. For example, a spectator playbook 604 associated with a spectator 102 viewing the video game indicates that the spectator enjoys watching the reaction of the crowd who are attending the video game event. Using the player playbook 602 associated with the players playing the video game and the gameplay data, the viewport recommendation model 620 may predict when the players 104 will make will make specific game moves that will yield a loud reaction from the crowd, e.g., slam dunk, game winning shot, blocked shot, etc. Accordingly, viewport recommendation model 620 may predict viewports that include the best reactions (e.g., facial reactions, loudest cheers, high-fives, etc.) from individuals reacting to the game moves.

In some embodiments, operation 622 can use the viewport recommendation model 620 to determine which viewport to select for a particular spectator 102 viewing the video game. In other embodiments, operation 622 can use the viewport recommendation model 620 to determine the type of dynamic data to generate for a particular spectator 102. Once the viewport and the dynamic data is determined, the viewport and the dynamic data may be included in a spectator video stream for the spectator. In some embodiments, while spectator views the video game, the viewport and the dynamic data can be dynamically updated by the system based the continuous processing of the player playbook, spectator playbook, and the gameplay data.

In some embodiments, the spectator feedback 624 operation can be configured to assess the spectator's response to the selected viewport and the dynamic data. In some embodiments, the feedback of the spectator may be explicit or implied by the spectator. For example, if the spectator does not look at or focus their attention on a viewport that is provided to the spectator, it may be implied that the spectator is not interested in the content. In another example, if the spectator manually zooms-in or clicks on a specific content in the viewport, it may be implied that the spectator is interested in the content. Accordingly, these inferences can be captured by the spectator feedback 624 operation and incorporated into the spectator playbook 604.

Figure 7:
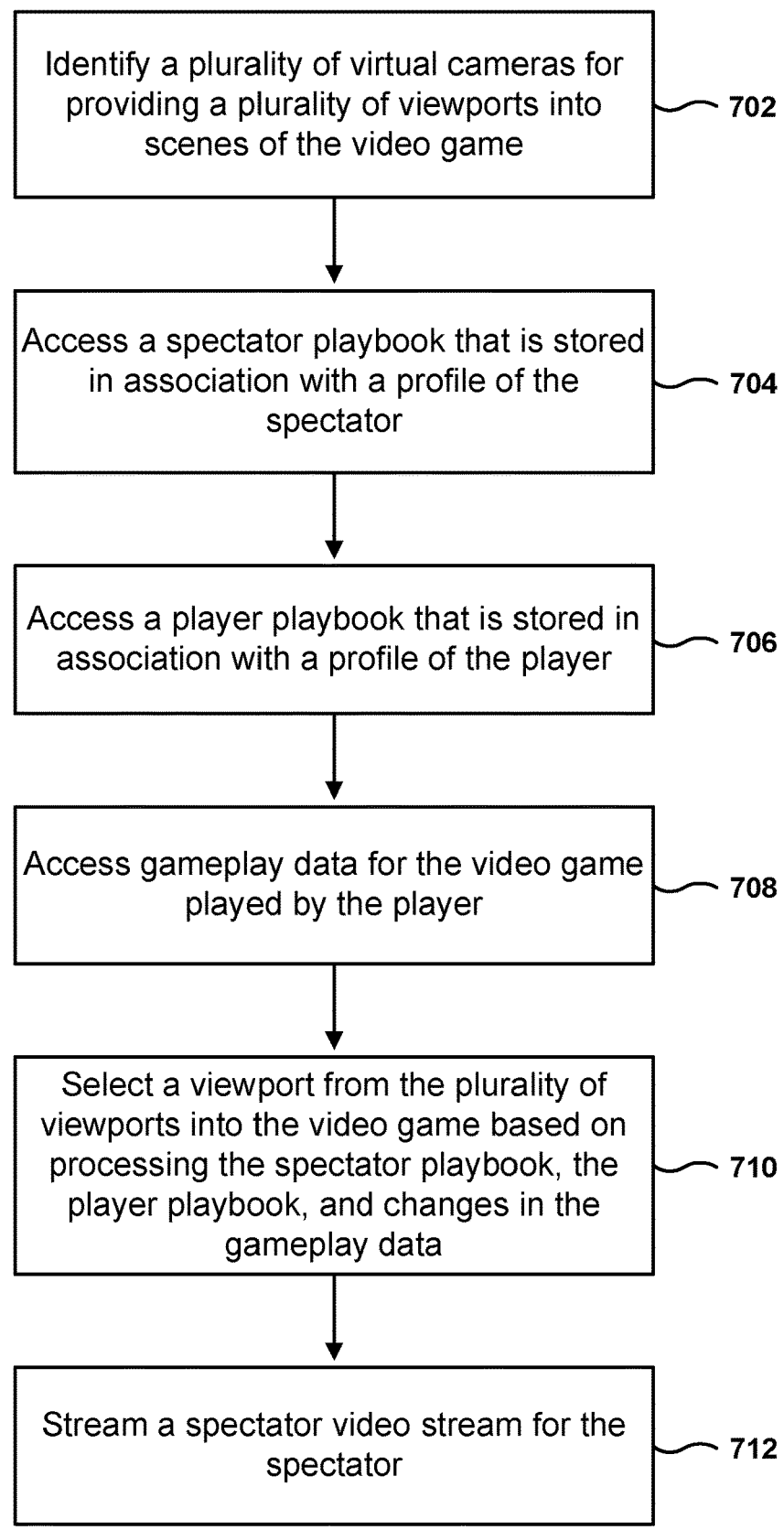
FIG. 7 illustrates a method for selecting a viewport into a video game for a spectator viewing the video game played by a player, in accordance with an implementation of the disclosure.

FIG. 7 illustrates a method for selecting a viewport into a video game for a spectator 102 viewing the video game played by a player 104. In one embodiment, the method described in FIG. 7 provides a spectator 102 with a customized viewing experience that includes viewports that are selected based on the preferences of the spectator 102. In one embodiment, the method includes an operation 702 that is configured to identify a plurality of virtual cameras 110 for providing a plurality of viewports into scenes of the video game. For example, a video game may include a plurality of virtual cameras 110 that are dispersed throughout the game environment and configured to record the gameplay of the players 104. Each virtual camera 110 may have a corresponding camera POV 112 that provides a viewport into the video game. In some embodiments, the virtual cameras 110 can zoom-in on specific game regions, dynamically move to capture specific viewing angles into the game scenes, and float to provide a birds-eye-view of the game environment.

The method shown in FIG. 7 then flows to operation 704 where the operation is configured to access a spectator playbook 604. The spectator playbook 604 is stored in association with a profile of the spectator and identifies viewing history of the spectator for types of video games viewed by the spectator. In some embodiments, the spectator playbook 604 includes information such as viewport preferences, viewing angle preferences, favorite players, gender, age, gaming experience, game play history, viewing history, gaming skill level, interests, disinterests, etc. In some embodiments, the spectator playbook 604 may be stored in association with a profile of the spectator 102 and include a model that may be initially trained using global features of users similar to the spectator 102. Over time, the model, based on the inputs and actions of the spectator 102, e.g., selections and views, will be trained more specifically to the spectator's preferences and dislikes which can be used to predict what the spectator may wish to view with more accuracy.

The method flows to operation 706 where the operation is configured to access a player playbook 602. The player playbook 602 is stored in association with a profile of the player 104 and identifies the performance of the player for types of video games played by the player. In one embodiment, since there can be a plurality of players 104 playing the video game, operation 706 is configured to access a playbook of a particular player based on the player being more active than other players, or based on the player being identified for following by a spectator 102, or based on the player being a main character in a scene or action sequence of the game, or based on the player having a social relationship with a spectator 102.

In some embodiments, the player playbook 602 includes information such as gameplay tendencies, specialized gaming skills, gaming skill level, player experience, signature game moves, biography information, statistics associated gameplay of the player, preferences, interests, disinterests, etc. In other embodiments, the player playbook 602 may include commentator type trivia information associated with the player or players, e.g., player N won her first E-sports event in 2019, player N started playing video games professionally when she was 16-years-old, player N holds the record for most assists in a game, etc. In some embodiments, the player playbook 602 may be stored in association with a profile of the player 104 and include a model that may be initially trained using global features of users similar to the player 104. Over time, the model, based on the inputs and actions of the player 104, will be trained more specifically to the player's gameplay tendencies and actions which can be used to predict with more accuracy what game actions the player 104 may perform.

The method shown in FIG. 7 then flows to operation 708 where the operation is configured to access gameplay data 606 for the video game played by the player. As noted above, the gameplay data 606 may be information associated with the game scenes in the video game, progression in the video game, points scored, position of the virtual cameras, total number of virtual cameras, contextual data regarding the scenes in the video game, metadata, game actions performed by the players, etc.

The method flows to operation 710 where the operation is configured to select a viewport from the plurality of viewports into the video game. In some embodiments, the viewport is selected and dynamically updated based on processing the spectator playbook 604, the player playbook 602, and changes in the gameplay data 606. As discussed above, the selected viewport is predicted to include game actions of the player 104 that are preferred by the spectator 102. In some embodiments, the selected viewport is predicted to include viewing angles into the scene of the video game that is preferred by the spectator 102. For example, based on a spectator playbook 604, the system may determine that the spectator enjoys watching a player perform a slam-dunk from a bird's-eye view rather than a side-view. Accordingly, when a player in the video game performs a slam-dunk, the viewport will provide an angle from a bird's-eye view for the spectator. In other embodiments, operation 710 is configured to generate dynamic data regarding the player 104 for presenting in a spectator video stream while the spectator 102 views the video game. In one embodiment, the dynamic data regarding the player 104 is customized based on the spectator playbook 604.

The method shown in FIG. 7 then flows to operation 710 where the operation is configured to stream a spectator video stream for the spectator 102. The spectator video stream may include the selected viewport and the generated dynamic data. Since the viewport and the dynamic data are selected and generated based on the preferences of the spectator, the spectator video stream is custom for each spectator 102 and allows the spectator to watch the video game in a seamless and efficient manner.

Figure 8:
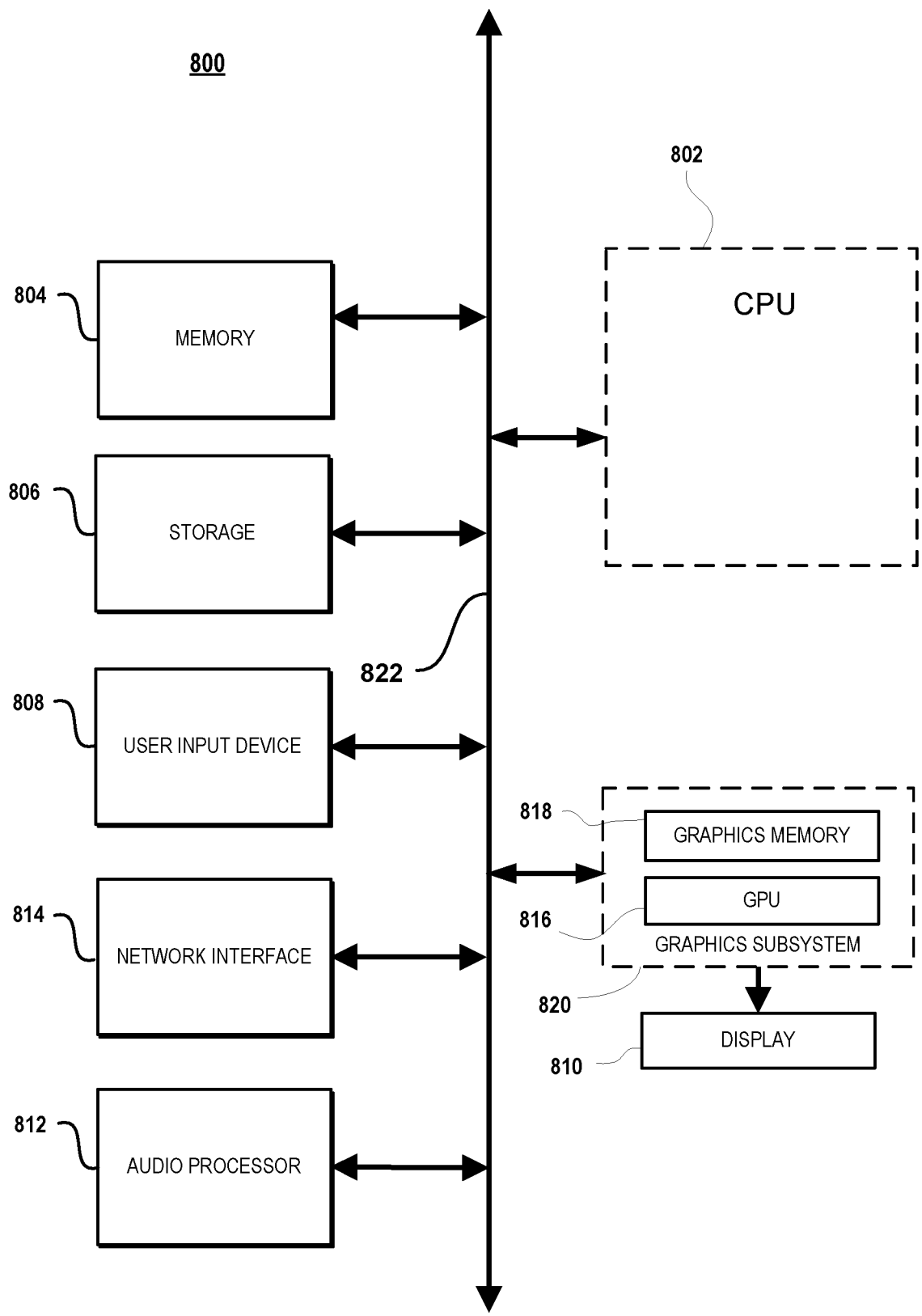
FIG. 8 illustrates components of an example device that can be used to perform aspects of the various embodiments of the present disclosure.

FIG. 8 illustrates components of an example device 800 that can be used to perform aspects of the various embodiments of the present disclosure. This block diagram illustrates a device 800 that can incorporate or can be a personal computer, video game console, personal digital assistant, a server or other digital device, suitable for practicing an embodiment of the disclosure. Device 800 includes a central processing unit (CPU) 802 for running software applications and optionally an operating system. CPU 802 may be comprised of one or more homogeneous or heterogeneous processing cores. For example, CPU 802 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 800 may be a localized to a player playing a game segment (e.g., game console), or remote from the player (e.g., back-end server processor), or one of many servers using virtualization in a game cloud system for remote streaming of gameplay to clients.

Memory 804 stores applications and data for use by the CPU 802. Storage 806 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 808 communicate user inputs from one or more users to device 800, examples of which may include keyboards, mice, joysticks, touch pads, touch screens, still or video recorders/cameras, tracking devices for recognizing gestures, and/or microphones. Network interface 814 allows device 800 to communicate with other computer systems via an electronic communications network, and may include wired or wireless communication over local area networks and wide area networks such as the internet. An audio processor 812 is adapted to generate analog or digital audio output from instructions and/or data provided by the CPU 802, memory 804, and/or storage 806. The components of device 800, including CPU 802, memory 804, data storage 806, user input devices 808, network interface 810, and audio processor 812 are connected via one or more data buses 822.

A graphics subsystem 820 is further connected with data bus 822 and the components of the device 800. The graphics subsystem 820 includes a graphics processing unit (GPU) 816 and graphics memory 818. Graphics memory 818 includes a display memory (e.g., a frame buffer) used for storing pixel data for each pixel of an output image. Graphics memory 818 can be integrated in the same device as GPU 808, connected as a separate device with GPU 816, and/or implemented within memory 804. Pixel data can be provided to graphics memory 818 directly from the CPU 802. Alternatively, CPU 802 provides the GPU 816 with data and/or instructions defining the desired output images, from which the GPU 816 generates the pixel data of one or more output images. The data and/or instructions defining the desired output images can be stored in memory 804 and/or graphics memory 818. In an embodiment, the GPU 816 includes 3D rendering capabilities for generating pixel data for output images from instructions and data defining the geometry, lighting, shading, texturing, motion, and/or camera parameters for a scene. The GPU 816 can further include one or more programmable execution units capable of executing shader programs.

The graphics subsystem 814 periodically outputs pixel data for an image from graphics memory 818 to be displayed on display device 810. Display device 810 can be any device capable of displaying visual information in response to a signal from the device 800, including CRT, LCD, plasma, and OLED displays. Device 800 can provide the display device 810 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for selecting a viewport into a video game for a spectator viewing the video game played by a player, comprising:
   identifying a plurality of virtual cameras for providing a plurality of viewports into scenes of the video game;
   accessing a spectator playbook, the spectator playbook is stored in association with a profile of the spectator, the spectator playbook identifying viewing history of the spectator for types of video games viewed by the spectator;
   accessing a player playbook, the player playbook is stored in association with a profile of the player, the player playbook identifying performance of the player for types of video games played by the player;
   accessing gameplay data for the video game played by the player during a session;
   selecting, during the session, a viewport from the plurality of viewports into the video game, the selected viewport is dynamically updated using a machine learning model that is configured to identify features from the spectator playbook, the player playbook, and the gameplay data to classify attributes of the spectator;
   wherein feedback received from the spectator related to at least one selected viewport that was dynamically updated is incorporated into the spectator playbook, such that said feedback is processed to extract features that are classified to update the machine learning model; and
   streaming a spectator video stream for the spectator, the spectator video stream presents a plurality of viewports that automatically changes based on the dynamic updating of the viewport while the spectator views the session of the video game played by the player.

2. The method of claim 1, wherein the viewport selected is predicted to include game actions of the player that are preferred by the spectator.

3. The method of claim 1, wherein the viewport selected is predicted to include viewing angles into the scenes of the video game preferred by the spectator.

4. The method of claim 1, wherein the player is one player of a plurality of players, and each of the plurality of players has a corresponding player playbook.

5. The method of claim 1, wherein the player is one player producing at least part of said gameplay data for the video game.

6. The method of claim 1, wherein the player is one player of a plurality of players, and said player is selected among the plurality of players for accessing said player playbook based on said player being more active than other players, or said player being identified for following by said spectator, or said player being a main character in a scene or action sequence of the video game, or said player having a social relationship with said spectator.

7. The method of claim 1, wherein the selected viewport is dynamically updated based on calls to the machine learning model to obtain predictions as to types of viewports that may be preferred by the spectator while the spectator is viewing the video game.

8. The method of claim 1, further comprising,
generating dynamic data regarding the player for presenting in the spectator video stream while the spectator views the video game, wherein the dynamic data regarding the player is customized based on the profile of the spectator.

9. The method of claim 8, wherein the dynamic data include data that provide statistics associated with the video game played by the player, player gaming metrics of the player, biographical information of the player, information related to other spectators viewing the video game, or a combination of two or more thereof.

10. The method of claim 1, wherein the plurality of virtual cameras are fixed or dynamically moves with a corresponding game action occurring within the video game.

11. The method of claim 1, wherein the selected viewport is further based on processing a gaze direction of the spectator or facial expression of the spectator in response to game actions occurring within the video game.

12. A method for selecting a viewport into a video game for a spectator viewing the video game played by a player, comprising:
identifying, by a server, a plurality of virtual cameras for providing a plurality of viewports into scenes of the video game;
accessing, by the server, a spectator playbook, the spectator playbook is stored in association with a profile of the spectator, the spectator playbook identifying viewing history of the spectator for types of video games viewed by the spectator;
accessing, by the server, a player playbook, the player playbook is stored in association with a profile of the player, the player playbook identifying performance of the player for types of video games played by the player;
accessing, by the server, gameplay data for the video game played by the player during a session;
selecting, by the server, a viewport from the plurality of viewports into the video game, the selected viewport is dynamically updated based on processing the spectator playbook, the player playbook, and changes in the gameplay data through a machine learning model, the machine learning model is configured to identify features from the spectator playbook, the player playbook, and the gameplay data to classify attributes of the spectator, the attributes of the spectator being used to select the viewport, and wherein the dynamic updating of the selected viewport accounts for feedback received from the spectator that relates to at least one selected viewport that was dynamically updated, the feedback is incorporated into the spectator playbook and processed to extract features that are classified to update the machine learning model; and
streaming, by the server, a spectator video stream for the spectator, the spectator video stream presents a plurality of viewports that automatically changes based on the dynamic updating of the viewport while the spectator views the session of the video game played by the player.

13. The method of claim 12, wherein the viewport selected is predicted to include game actions of the player that are preferred by the spectator.

14. The method of claim 12, wherein the viewport selected is predicted to include viewing angles into the scenes of the video game preferred by the spectator.

15. The method of claim 12, wherein the selected viewport is dynamically updated based on calls to the machine learning model to obtain predictions as to types of viewports that may be preferred by the spectator while the spectator is viewing the video game.

16. The method of claim 12, further comprising,
generating by the server, dynamic data regarding the player for presenting in the spectator video stream while the spectator views the video game, wherein the dynamic data regarding the player is customized based on the profile of the spectator.

17. The method of claim 16, wherein the dynamic data include data that provide statistics associated with the video game played by the player, player gaming metrics of the player, biographical information of the player, information related to other spectators viewing the video game, or a combination of two or more thereof.

18. The method of claim 12, wherein the selected viewport is further based on processing a gaze direction of the spectator or facial expression of the spectator in response to game actions occurring within the video game.

* * * * *